US009668264B2

(12) United States Patent
Forsman et al.

(10) Patent No.: US 9,668,264 B2
(45) Date of Patent: May 30, 2017

(54) METHOD AND ARRANGEMENT FOR SCHEDULING IN SHARED COMMUNICATION NETWORKS

(71) Applicant: Telefonaktiebolaget L M Ericsson (Publ), Stockholm (SE)

(72) Inventors: Mats Forsman, Ronninge (SE); Tomas Thyni, Jarfalla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 114 days.

(21) Appl. No.: 14/355,614

(22) PCT Filed: Apr. 3, 2014

(86) PCT No.: PCT/SE2014/050408
§ 371 (c)(1),
(2) Date: May 1, 2014

(87) PCT Pub. No.: WO2015/152779
PCT Pub. Date: Oct. 8, 2015

(65) Prior Publication Data
US 2015/0289277 A1    Oct. 8, 2015

(51) Int. Cl.
*H04W 24/10* (2009.01)
*H04W 72/04* (2009.01)
(Continued)

(52) U.S. Cl.
CPC ......... *H04W 72/0486* (2013.01); *H04L 69/22* (2013.01); *H04W 28/08* (2013.01); *H04W 88/10* (2013.01)

(58) Field of Classification Search
CPC ................ H04L 5/0053; H04L 5/0094; H04L 29/06163; H04L 43/0882; H04L 47/10; H04L 47/11; H04L 47/2441
(Continued)

(56) References Cited

U.S. PATENT DOCUMENTS 7,653,024 B2 *   1/2010   Dekorsy ........... H04W 72/0453
                                                                 370/208
8,280,389 B1 *  10/2012   Turtinen ............... H04W 24/10
                                                                 455/450
(Continued)

FOREIGN PATENT DOCUMENTS

WO          2011/046477          4/2011

OTHER PUBLICATIONS

Link Sharing and Resource Management Models for Packet Networks by Sally Floyd and Van Jacobson, IEEE/ACM, vol. 3 No. 4 Aug. 1995.*

(Continued)

*Primary Examiner* — Brandon Renner
*Assistant Examiner* — Sai Aung
(74) *Attorney, Agent, or Firm* — Nicholson de Vos Webster & Elliott, LLP (57) ABSTRACT

Method in a transport network node, for distributing an available bandwidth between different access technologies utilizing the transport network node, the transport network node being associated with at least one network node. The method comprises obtaining an allocation scheme reflecting a desired distribution of bandwidth between the different access technologies, and receiving information from the at least one network node, regarding an access technology of the at least one network node. Furthermore, the method comprises scheduling transport of packet data, based on the received information regarding the access technology and the obtained allocation scheme. By implementing functionality in transport network nodes for scheduling transport of packet data based on the access technology, and number of active users, and/or number of active sessions, etc., the transport network node is enabled to allocate an appropriate
(Continued)

amount of transport capacity fair between users of different access technologies.

14 Claims, 8 Drawing Sheets

(51) Int. Cl.
  *H04L 29/06* (2006.01)
  *H04W 88/10* (2009.01)
  *H04W 28/08* (2009.01)

(58) Field of Classification Search
  USPC .................. 370/208, 235, 252, 254, 329
  See application file for complete search history.

(56) References Cited

U.S. PATENT DOCUMENTS

| | | | | |
|---|---|---|---|---|
| 2009/0040970 | A1* | 2/2009 | Ahmadi | H04B 7/2612 370/329 |
| 2011/0085513 | A1* | 4/2011 | Chen | H04W 72/042 370/330 |
| 2011/0269492 | A1* | 11/2011 | Wang | H04L 5/003 455/509 |
| 2012/0057478 | A1* | 3/2012 | Brannstrom | H04W 72/10 370/252 |
| 2012/0202549 | A1* | 8/2012 | Eriksson | H04W 28/16 455/513 |
| 2013/0137423 | A1* | 5/2013 | Das | H04W 12/08 455/426.1 |
| 2014/0226522 | A1* | 8/2014 | Anandappan | H04W 16/18 370/254 |
| 2014/0302859 | A1* | 10/2014 | Nama | H04W 16/10 455/447 |

OTHER PUBLICATIONS

PCT Notification of Transmittal of the International Search Report and the Written Opinion of the International Searching Authority, for PCT Counterpart Application No. PCT/SE2014/050408, mailed Jan. 20, 2015, 12 pages.

Floyd, et al., "Link-sharing and Resource Management Models for Packet Networks," IEEE/ACM Transactions on Networking, vol. 3 No. 4, Aug. 1995, 22 pages.

Bernet, Yoram, "Networking Quality of Service and Windows Operating Systems: Chapter 3: Queuing Mechanisms," Pearson Education, Nov. 14, 2000, XP055107735, retrieved from the internet on Mar. 13, 2014 at http://www.ablongman.com/samplechapter/1578702062.pdf, 24 pages.

PCT Written Opinion of the International Preliminary Examining Authority, PCT Counterpart Appl. No. PCT/SE2014/050408, mailed Mar. 3, 2016, 8 pages.

PCT International Preliminary Report on Patentability, PCT Counterpart Appl. No. PCT/SE2014/050408, mailed May 19, 2016, 17 pages.

* cited by examiner

Fig. 1 (Exisiting art)

METHOD AND ARRANGEMENT FOR SCHEDULING IN SHARED COMMUNICATION NETWORKS

CROSS-REFERENCE TO RELATED APPLICATIONS

This application is a National stage of International Application No. PCT/SE2014/050408, filed Apr. 7, 2014, which is hereby incorporated by reference.

TECHNICAL FIELD

The present disclosure relates to management of transport capacity in transport networks, especially it relates to distribution of available bandwidth for packet data.

BACKGROUND

With emergence of communication services, the amount of data in communication networks has increased with time. To meet user demands for as well increased communication capacity and fast communication, new access technologies have been developed. In transport networks, such as aggregation networks or access networks, transport network nodes will then be capable of transporting user data originating from different access technologies within the same transport network.

Figure 1:
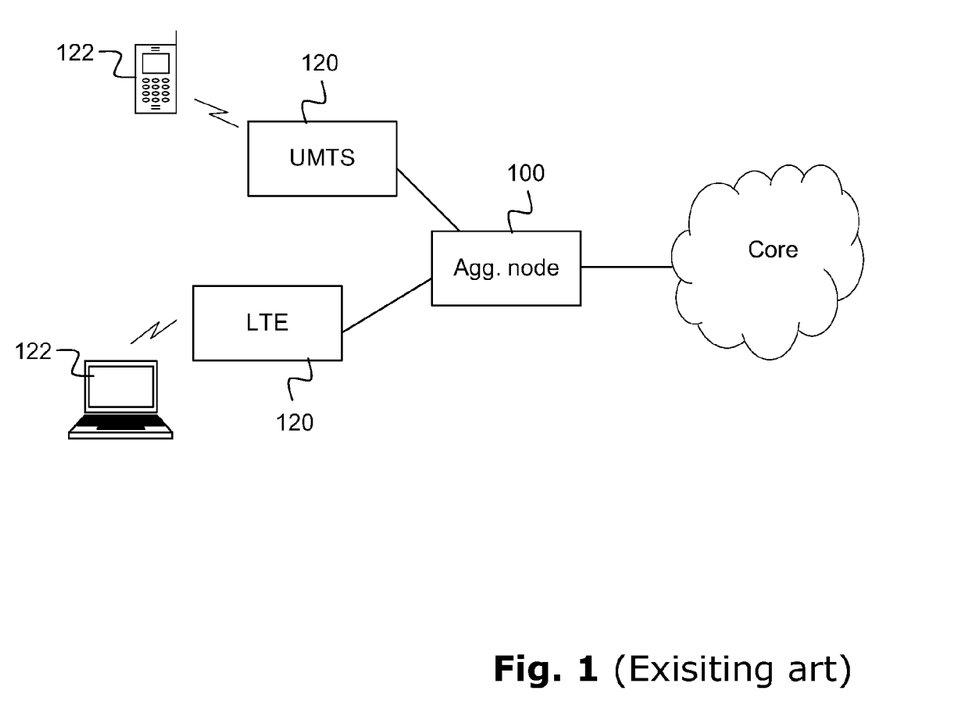
FIG. 1 is a schematic illustration of an arrangement in accordance with the prior art.

FIG. 1 which is a schematic overview illustrates an aggregation node 100 which is a router of a transport network, receives packet data according to two different access technologies (LTE and UMTS) from two respective network nodes 120 to which network communication devices 122 are connected. The aggregation node 100 is arranged to transport the received packet data into a core network.

The term "network communication device" will be used throughout this description to denote any device which is capable of network communications. The term network communication device may thus include any device, which may be used by a user for network communications. Accordingly, the term network communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. In addition, the term network communication devices, may further relate to fixed connected devices of a communication network, such as terminals, computers, etc. of a LAN (Local Area Network) or public switched network. Yet further, the term wireless communication device includes MTC (Machine Type Communication) devices, which do not necessarily involve human interaction. MTC devices are sometimes referred to as Machine-to-Machine (M2M) devices.

Different communication technologies have different access times. For instance an RTT (round trip time) of LTE (Long Term Evolution) is substantially lower than a round trip of UMTS (Universal Mobile Telephony System). When different access technologies are sharing common transport networks, the access technologies that have longer RTT will get a problem with the throughput, due to TCP inherent mechanisms. It has been experienced in shared networks between UMTS and LTE that the UMTS technology is starving while LTE takes most of the capacity for e.g. the best effort traffic.

Adding to the complexity is when traffic is sent in encrypted tunnels, e.g. IPSec (Internet Protocol Security), and all information from within the packets are hidden, thus it's impossible to perform any fairness scheduling per technology and per user.

Thus there is a problem to satisfactory allocate transport resources in shared communication networks.

SUMMARY

It would be desirable to obtain improved performance of transport of packet data in transport networks. It is an object of this disclosure to address at least any of the issues outlined above.

Further, it is an object to control transport of packet data relating to different access technologies. These objects may be met by a method and an arrangement according to the attached independent claims.

Figure 5:
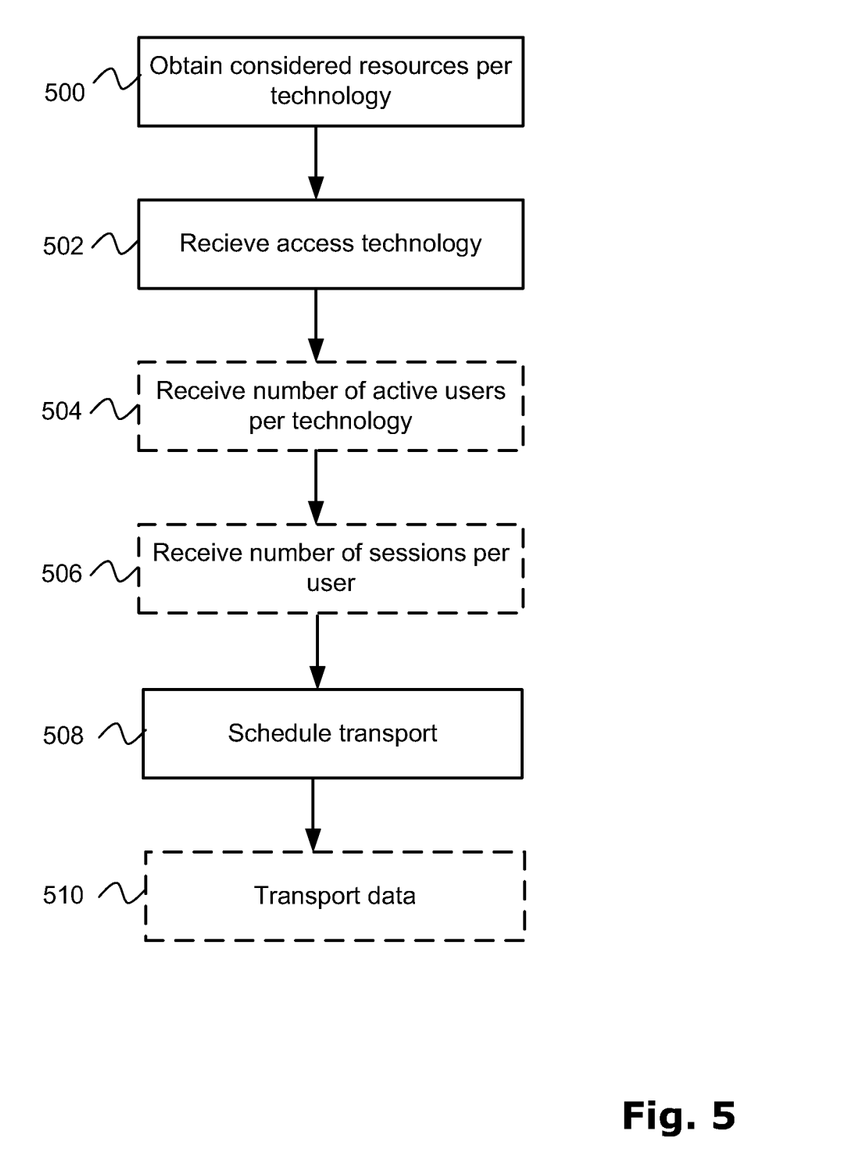
FIG. 5 is a schematic illustration of a method, according to possible embodiments.

According to one aspect, a method is provided which is performed by a transport network node 200, 300, such as a router, for distributing an available bandwidth between different access technologies utilising the transport network node 200, 300, the transport network node 200, 300 being associated with at least one network node 220, 230, 320, such as a NodeB or an eNodeB. The method comprises obtaining 500 an allocation scheme reflecting a desired distribution of bandwidth between the different access technologies, and receiving 502 information from the at least one network node 220, 230, 320, regarding an access technology of the at least one network node 220, 230, 320. Furthermore, the method comprises scheduling 508 transport of packet data, based on the received information 502 regarding the access technology and the obtained allocation scheme.

Furthermore, the received 502 information regarding the access technology may be comprised in suitable headers of received packet data. Further information regarding a number of active users per access technology and/or a number of sessions per active user may be received, and the scheduling may be further based on the number of active users per access technology and/or number of sessions per active user. The information regarding the number of active sessions may be implemented as different ranges of sessions per active user. The scheduling may comprise calculating specific weights which are applied when calculating ratios for access technologies.

Figure 3:
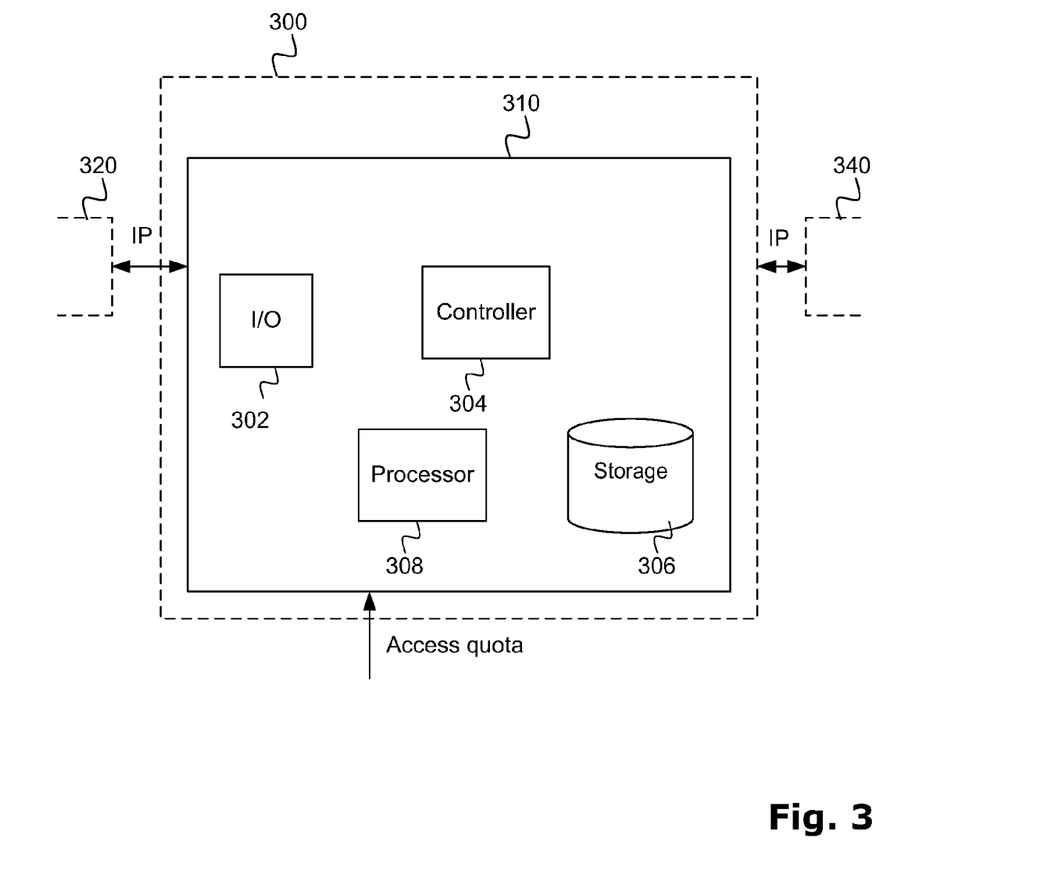
FIG. 3 is a schematic illustration of an arrangement, according to possible embodiments.

According to another aspect a communication management module 310 is provided which is adapted to be arranged in a transport network node 200, 300 for distributing an available bandwidth between different access technologies utilising the transport network node 200, 300, the transport network node 200, 300 being associated with at least one network node 220, 230, 320. The communication management module 310 comprises a controller 304 which is adapted to obtain an allocation scheme reflecting a desired distribution of bandwidth between the different access technologies, and a communication interface module 302 which is adapted to receive information from the at least one network node 220, 230, 320, regarding an access technology of the at least one network node 220, 230, 320. The controller 304 is further adapted to schedule transport of packet data, based on the received information regarding the access technology and the obtained allocation scheme.

Moreover, the communication management module 310 may be adapted to receive further information and apply when scheduling, correspondingly to the method described above.

According to a further aspect a transport network node 200, 300 is provided which comprises the communication management module of the above defined aspect. The transport network node 200, 300 may be implemented as any of: a router, an RNC (Radio Network Controller), an AP (Access point), an AC (Access Center), a DSLAM (Digital Subscriber Line Access Multiplexer), a CMTS (Cable Modem Termination Systems) entity, and an OLT (Optical Line Termination)

By implementing functionality in transport network nodes for scheduling transport of packet data based on the access technology, and number of active users, and/or number of active sessions, etc. the transport network node is enabled to allocate an appropriate amount of transport capacity fair between users of different access technologies.

BRIEF DESCRIPTION OF DRAWINGS

The solution will now be described in more detail by means of exemplary embodiments and with reference to the accompanying drawings, in which:

FIG. 4 *a-c* are schematic illustrations of headers, according to possible embodiments.

FIG. 6*a-c* are schematic illustrations, according to a possible embodiment.

DETAILED DESCRIPTION

Transport networks nodes are commonly not aware of which access technology received packet data relates to, and are therefore not able to allocate communication capacity fair between the access technologies. By providing information with packet data, regarding access technology of active users, network nodes will be enabled to calculate specific scheduling weights. By applying these scheduling weights, transport network nodes which supports limited number of queues and hierarchies will be enabled to schedule fair without knowledge of the individual users.

Figure 2:
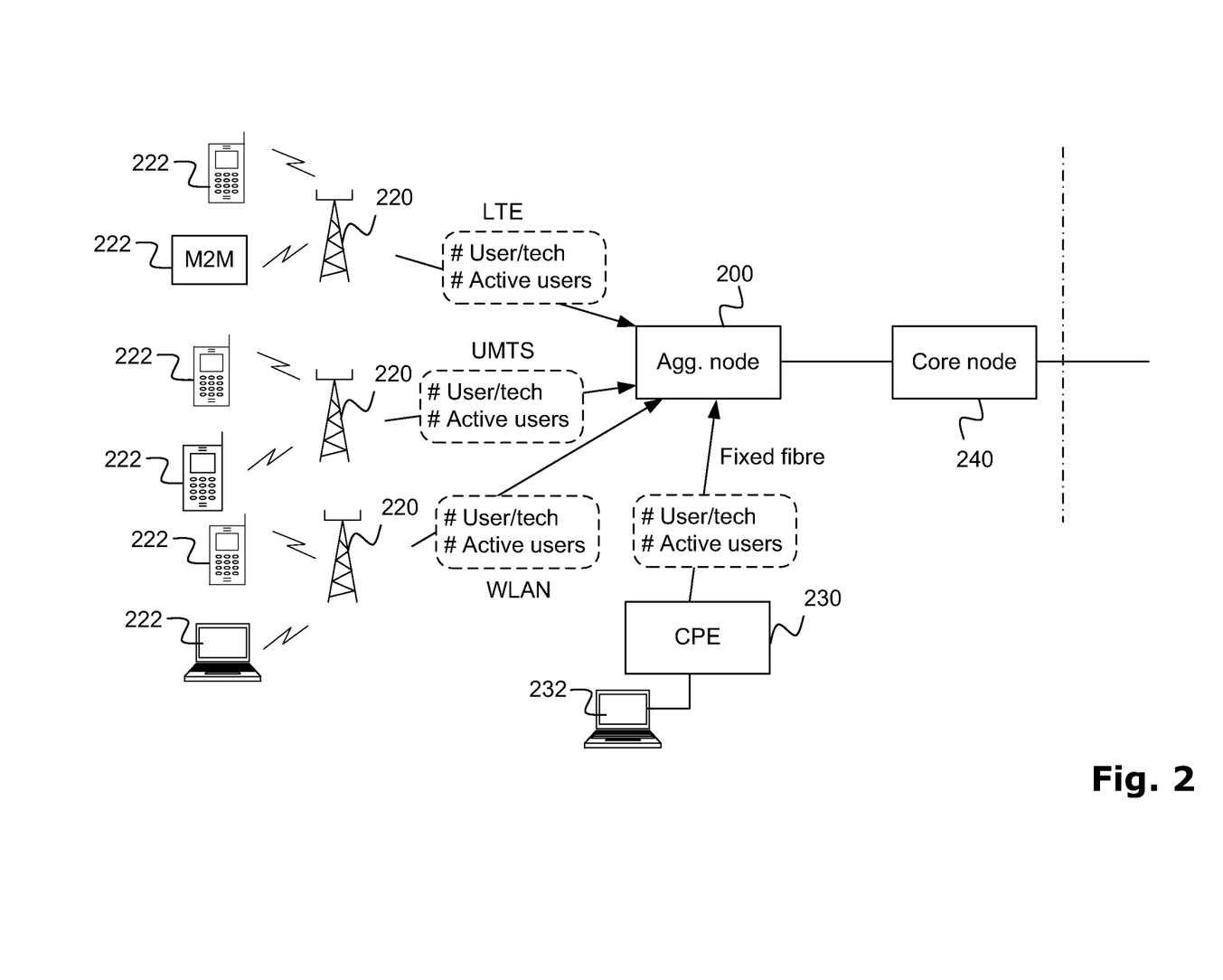
FIG. 2 is a schematic illustration of an arrangement, according to a possible embodiment.

With reference to FIG. 2, which is a schematic block diagram, a transport network and transport network nodes will now be described in accordance with one exemplifying embodiment.

An aggregation network (not referred to) connects wireless communication devices 222, such as UEs (User Equipments) and M2M devices (Machine to Machine) to a core node 240 of a core network (not referred to). The wireless communication devices 222 are connected via network nodes 220 of different access technologies to an aggregation node 200, which is connected to the core node 240. To the aggregation node 200 is also fixed communication devices 232, such as computers of a LAN (Local Area Network) connected to the aggregation node 200 via network nodes 230. The network nodes 220 which connects the wireless communication devices 222, is typically implemented as suitable radio base stations, such as NodeBs, or eNodeBs, but may alternatively be implemented as WLAN access points. The network node 232 is typically implemented as a CPE (Customer Premise Equipment), which may be a router, a modem, a switch, etc.

The network nodes 220, 230 communicates packet data from the network nodes 220, 230 to the aggregation node, but complements the data packets with information regarding the number of users of their respective access technology, and a number of active users of their respective access technologies. As will be further discussed in conjunction with another embodiment, the aggregation node 200 applies this received information for allocating communication capacity to the different access technologies when scheduling. By providing functionality in the network nodes 220, 230 to provide information regarding access technology and the number of currently active users of that access technologies, and functionality in the aggregation node 200 for making use of the received information regarding access technology and number of currently active users when scheduling, the aggregation node 200 will be enabled to increase fairness between different access technologies when distributing packet data.

It is to be noted that even if the aggregation node 200 is located in the aggregation network which connects network nodes 220, 230 to a core node 240, the disclosed concept is not limited thereto. The proposed solution may be implemented in any suitable network node which transports packet data originating from different access technologies. For instance, the proposed solution may be implemented in modems, Wi-Fi access points, local routers, etc. Furthermore, the proposed solution is not limited to any specific access technology, and may be implemented in a plurality of access technologies, such as LTE Long Term Evolution, LTE Advanced, UMTS (Universal Mobile Telephony System), HSPA (High Speed Packet Access), WLAN (Wireless Local Area Network), Wi-Fi (Wireless Fidelity), DSL (Digital Subscriber Line), GPON (Gigabit Passive Optical Network), PtP fibre (Point to point), etc.

With reference to FIG. 3, which is a schematic block diagram, communication management module 310 will now be described, in accordance with one exemplifying embodiment. The communication management module 310 is adapted to be comprised in a transport network node 300. The communication management module comprises a communication interface module 302, a controller 304, and optionally a storage module 306 and a processor 308.

The controller 304 is adapted to obtain an allocation scheme which reflects a desired distribution of bandwidths between different access technologies. The allocation scheme may define proportions of bandwidths for the different access technologies, which are desired by an operator. In this embodiment, the allocation scheme is obtained from the operator as an access quota between the different access technologies. The access quota may be preset and stored in the optional storage module 306.

The communication interface module 302 is adapted to receive information from at least one network node 320 regarding an access technology of at least network node 320. In this embodiment, the information regarding the access technologies is received in headers of packet data (shown as IP in the figure) from the network node 320, and the packets are received in accordance with any suitable transport protocol, e.g. Internet Protocol. However, disclosed concept is not limited thereto, the information may be alternatively received, e.g. as specific signals or parameters through any suitable input of interface. The controller 304 is further adapted to schedule transport of the packet data, based on the received information regarding the access technology and the obtained allocation scheme.

The principle of the scheduling will be described below in conjunction with another exemplifying embodiment. The optional processor 308 may be arranged to provide calculation capacity to the communication management module 310.

In an alternative embodiment, which is based on the one above, a transport network node 300 comprises the communication network module 310. The transport network node 300 may be implemented as a router, a modem, a switch, etc. The transport network node is adapted to send the packet data to a core network node 340 or a further transport network node 300, in accordance with any suitable transport protocol, such as IP. The transport network node 300 may be implemented as any suitable node, e.g. as a router, an RNC (Radio Network Controller), an AP (Access Point), an AC (Access Center), a DSLAM (Digital Subscriber Line Access Multiplexer), a CMTS (Cable Modem Termination Systems) entity etc. Furthermore, the transport network node 300 may be implemented as an OLT (Optical Line Termination), e.g. for PtP (Point to Point) or PtMP (Point to Multipoint) transport.

With reference to the five tables below, the resulting allocation of transport capacity, when the proposed solution is applied will now be described, in accordance with an embodiment example. In this embodiment, a transport network node is scheduling transport of packet data of four different access technologies, i.e. UMTS, LTE, Fixed fiber, and Wi-Fi. For all the tables, the first column shows the access technology, the second column shows the resulting bandwidth per active user of the access technology, the third column shows the number of active users, and the fourth columns shows the resulting bandwidth per access technology.

The first table illustrates a typical situation in a transport network node, wherein there are 10 active users of each access technology and the proposed solution is not applied. As seen, the resulting bandwidth will be uneven distributed between the different access technologies, due to differences in RTT between technologies. For instance, UMTS-users will be starving when fixed fiber-users gain in transport capacity.

| Technology | BW/user | # users | BW/technology |
| --- | --- | --- | --- |
| UMTS | 0.7% | 10 | 7% |
| LTE | 2% | 10 | 20% |
| Fixed fiber | 4.3% | 10 | 43% |
| Wi-Fi | 3% | 10 | 30% |

The second table illustrates a situation where there also are 10 active users of each access technology, but where the scheduling is performed based on the access technologies. As seen the allocated transport capacity is fair distributed between the different access technologies and users, when there are equal amount of users in each technology.

| Technology | BW/user | # users | BW/technology |
| --- | --- | --- | --- |
| UMTS | 2.5% | 10 | 25% |
| LTE | 2.5% | 10 | 25% |
| Fixed fiber | 2.5% | 10 | 25% |
| Wi-Fi | 2.5% | 10 | 25% |

The third table illustrates the situation where the scheduling is performed based on the access technologies, but there are different numbers of active users of the access technologies. As seen, the resulting allocated bandwidth of the active users is unevenly distributed between active users of different access technologies. For instance, active users of UMTS and LTE starve while active users of fixed fiber and Wi-Fi gain.

| Technology | BW/user | # users | BW/technology |
| --- | --- | --- | --- |
| UMTS | 2.5% | 10 | 25% |
| LTE | 2.5% | 10 | 25% |
| Fixed fiber | 12.5% | 2 | 25% |
| Wi-Fi | 5% | 5 | 25% |

The fourth table illustrates the situation when the available bandwidth is distributed based on both access technology and the number of active users of the access technologies. By taking both the access technologies and the current number of active users of each access technology into account when scheduling, the transport network node may dynamically distribute transport capacity between the access technologies, which results in an effective and flexible use of available transport capacity. When put into practice, the scheduler calculates a weight parameter for each access technology, which will be further discussed below in conjunction with another embodiment.

| Technology | BW/user | # users | BW/technology (equal weight 25% each) |
| --- | --- | --- | --- |
| UMTS | 3.7% | 10 | 37% |
| LTE | 3.7% | 10 | 37% |
| Fixed fiber | 3.7% | 2 | 7.4% |
| Wi-Fi | 3.7% | 5 | 18.5% |

The fifth table illustrates also a situation where the available bandwidth is distributed based on both access technology and the number of active users. In the example of the fifth table, the operator has assigned un-equal weights and performed the method of distributing available bandwidth according to alternative un-equal weights of weights for the access technologies. By this solution, an operator who favours one access technology before another access technology will also be able to distribute bandwidth dynamically dependent on the number of active users of the different access technologies.

| Technology | BW/user | # users | BW/technology (Un-equal weight 15, 30, 35, 20%) |
| --- | --- | --- | --- |
| UMTS | 2.42% | 10 | 24.2% |
| LTE | 4.84% | 10 | 48.4% |
| Fixed fiber | 5.65% | 2 | 11.3% |
| Wi-Fi | 3.22% | 5 | 16.1% |

In a transport network, a transport network node distributes data which originates from four different access technologies, UMTS, LTE, Fixed Fiber, and Wi-Fi. The transport network node receives data packets which comprises information regarding the respective access technology and the number of user. In this embodiment, the transport network node receives information from the access node regarding which access technology the access node operates in accordance with, and the number of achieve users which that the access node currently serves. The information regarding access technology and number of users is comprised in headers of the data packets which are sent from the access node.

With reference to the FIGS. 4a-c, which are schematic illustrations of data packets, three different data packets will now be described in accordance with exemplifying embodiments.

Figure 4A:
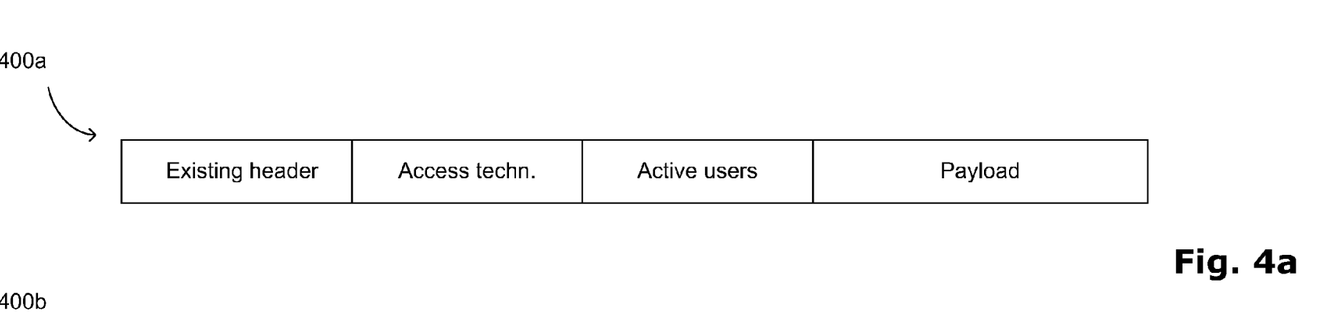

FIG. 4a illustrates a data packet 400a which comprises a conventional header and payload data, but is complemented with information regarding an access technology and the number of active users of that access technology. In this embodiment the information regarding the access technology and the number of active users of that access technology are placed between the conventional header and the payload.

Figures 4B, 4C:
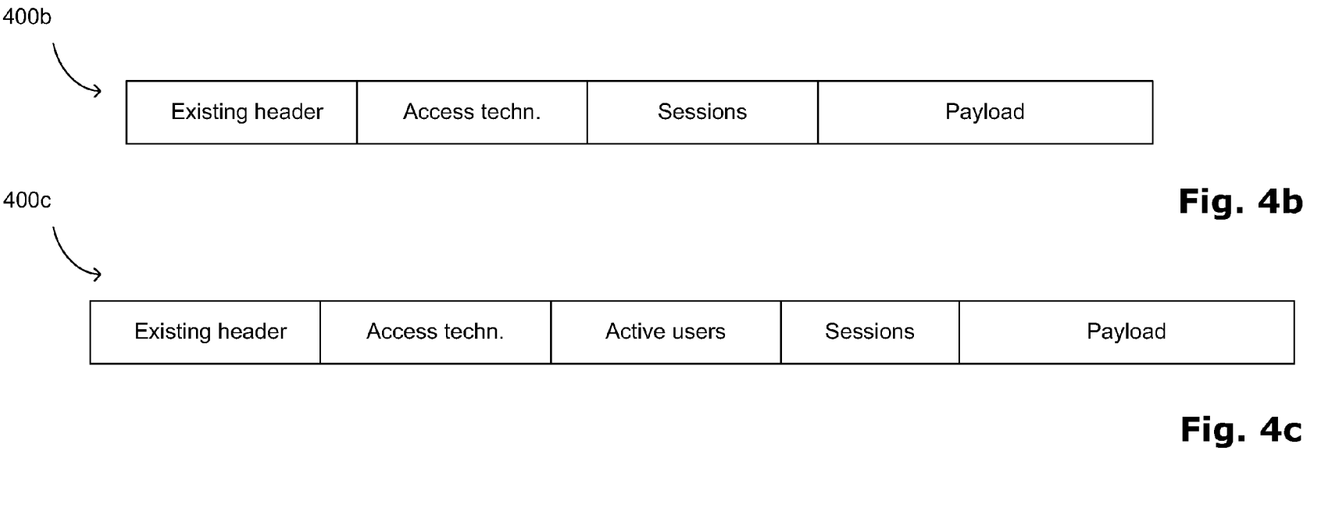

FIG. 4b, which is similar to the FIG. 4a illustrates instead a data packet 400b which also comprises a conventional header and a payload. The data packet 400b is instead complemented with information regarding an access technology and a range of sessions for the user. For instance, the information may specify that the access technology is UMTS and that the present user of the data packet currently takes part in between 20 and 45 sessions.

FIG. 4c, which is similar to the FIG. 4a illustrates instead a data packet 400c which also comprises a conventional header and a payload. The data packet 400c is instead complemented with information regarding an access technology and a range of sessions for the user, but also a number of active users of that access technology. As described above in conjunction with another exemplifying embodiment, a scheduler of a transport network node may make use of this information to allocate transport capacity in the transport network per access technology, per access technology and the number of active users, per access technology and number of users and number of sessions, etc.

However, the concept is not limited thereto, the network nodes may be applied to provide any suitable combination of information regarding access technology, number of active users, and number of sessions per active user, which the transport network node may be adapted to make use of when scheduling transport of packet data.

The above described embodiments describe the headers in a schematic manner, to simplify the understanding. However, when put into practise, the different headers are adapted to any suitable transport protocol, e.g. GTP-u (GPRS (General Packet Radio Service) Tunnelling Protocol-User Data Tunnelling), 3GPP-IuB, CAPWAP (Control And Provisioning of Wireless Access Points), GRE (Generic Routing Encapsulation), and IPSec (Internet Protocol Security), etc. For instance, suitable flags will be added to positions of the conventional headers to define that additional information is relating to access technology, etc. is attached to the data packets.

The information regarding access technology, number of active user, and number of sessions may be provided to the transport network node in different ways. Below, some embodiments where the information is attached to the headers of data packets will be described. However, disclosed concept is not limited thereto, and the information may be alternatively provided. For instance the information may be provided as separate suitable data packet or messages or signals.

It is to be noted that the described principles and methods are not limited to upstream transport.

When transporting packet data in a downstream direction, each access technology Edge node (PDN-GW (Packet Data Network Gateway), BNG (Broadband Network Gateway), etc.) terminates the transport tunneling protocol in the upstream and copies the received extension headers and adds them to the user downstream transport tunneling protocol towards the access node. Aggregation nodes in downstream direction can then schedule Bandwidth Fairness in the same way as in earlier described upstream direction. Correspondingly as in the upstream scenario, the information regarding access technology etc. is not limited to be provided in packet data headers, and may be provided as any suitable signal or parameter when appropriate.

With reference to FIG. 5, which is a schematic flow chart, a method performed by a transport network node will now be described in accordance with one embodiment.

In a first action 500, the transport network node obtains an allocation scheme which reflects a desired distribution of bandwidth between different access technologies. As stated above, the allocation scheme may be pre-set in the transport network node and define proportions of the distribution of bandwidth.

In a following action 502, the transport network node receives information regarding the different access technologies of received packet data. As disclosed in another embodiment, this information may be received in extended headers of the packet data, which are received according to any suitable transport protocol.

In another action 508, the transport network node schedules transport of the packet data to another transport network node or edge node based on the access technologies and the obtained allocation scheme, such that the transport network node is enabled to transport the packet data fair scheduled according to access technologies in a final action 510.

The principles of the scheduling of action 508 will be defined in more detail below and will therefore not be further discussed in this embodiment.

In an alternative exemplifying embodiment which is based on the above described embodiment, the transport network node in addition receives information regarding the number of active users per access technology in an intermediate action 504. This additional information may be applied as a further basis when scheduling in action 508, as will be described in more detail below in conjunction with another embodiment. The transport network node may further, in an optional action 506, receive information regarding the number of session which the active users perform. Also the information regarding the number of sessions may be applied as a further basis when scheduling. As well the information regarding the number of active users per access technology and the number of sessions per active user may be received in extended headers, which will be further disclosed below.

With reference to the FIGS. 6a and 6b, which are schematic illustrations, a principle and an example of a scheduling calculation will be described, in accordance with one exemplifying embodiment.

Figure 6A:
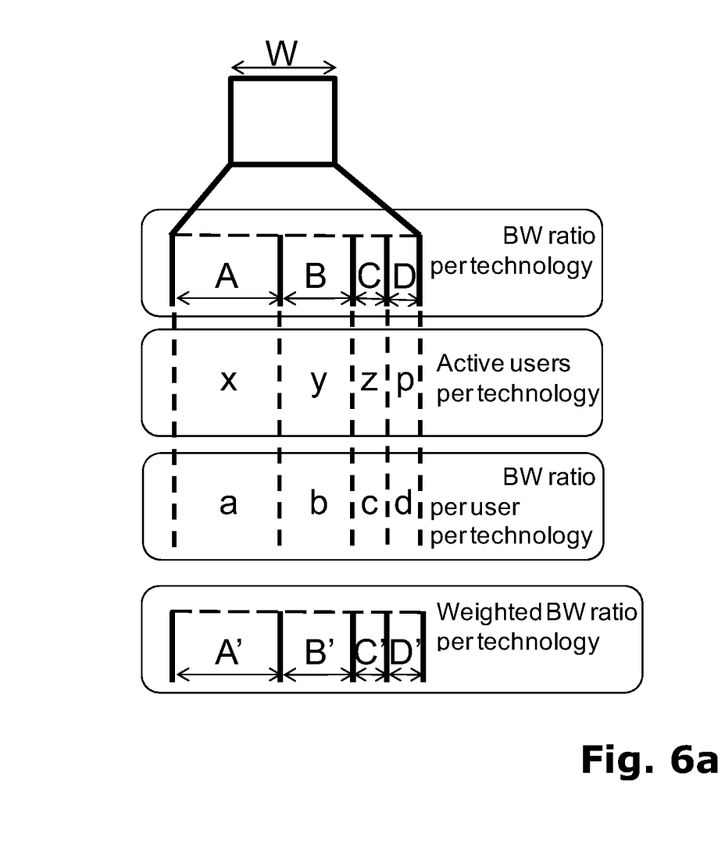

FIG. 6a illustrates some definitions of parameters in a transport network node which transports packet data originating from four access technologies. For the first access technology the operator has allocated a bandwidth ratio A, for the second access technology a bandwidth ratio B, for the third access technology a bandwidth ratio C, and for the fourth access technology a bandwidth ratio D. The total bandwidth ratio is 100%, i.e. A+B+C+D=100%. The numbers of active users per access technologies are x, y, z, and p. The bandwidth ratios per active user of the access technologies are a, b, c, and d. It is to be noted that even if the operator has considered that there are the same number of active users of each access technology, the bandwidth ratios per active user of the technologies will typically vary, which will be illustrated in an example below.

A scheduling function within the transport network node will calculate a weighted bandwidth ratio for each access technology A', B', C', and D', which will be applied when scheduling packet data to be transported. When there is equal number of active users of each access technology, the proportions of the total bandwidth per access technology A, B, C, and D are the same as the proportions of the total bandwidth per active user and access technology.

Figure 6B:
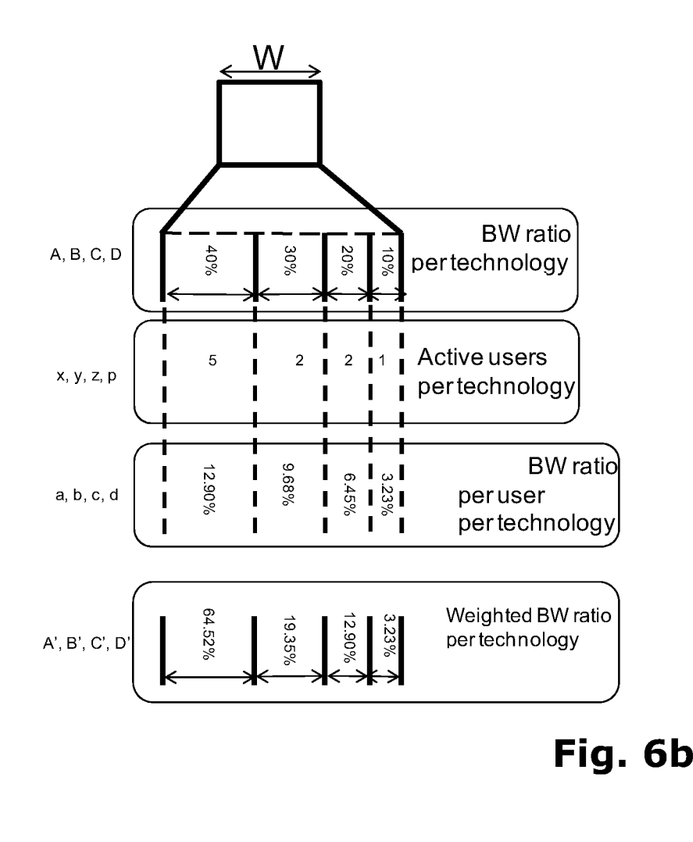

FIG. 6b will illustrate the method which is performed, according to an example.

In this example, the operator has considered that there is the same number of active users of each access technology, and that users of the first access technology will be allocated more bandwidth. In this example, the operator considers that a user of the first access technology will be allocated 1.3 times (40/30) the bandwidth which a user of the second access technology will be allocated. Correspondingly, the operator has considered that the user of the first access technology will be allocated 2 times (40/20) the bandwidth which a user of the third access technology will be allocated, etc. However the operator is not aware of the current number of active users.

However, the number of users varies with time. A traditional scheduling function in a transport network node is not able to adjust allocated bandwidth according to the varying number of active users. For 5, 2, 2, and 1 active user of the four access technologies, a traditional scheduling function would have allocated 8% (40/5), 15% (30/2), 10% (20/2), and 10% (10/1) to active users of the various technologies. Then users of the first access technology would have been starving, while users of the third and fourth access technology would have been gaining.

A scheduling function of the proposed method would instead make use of received information regarding the number of active users per access technology for to calculate an appropriate weighted bandwidth ratio per access technology, to apply when scheduling.

In this embodiment the total sum of bandwidth ratios is calculated by first multiplying each per user per access technology bandwidth with related number of users (e.g. a*x) and then sum up all the access technologies. The scheduler setting for the respective access technology will be the respective products: a*x, b*y, c*z and d*p. However, the scheduling function is not aware of the bandwidth ratio per user per technology a, b, c, d, but calculates them as follows.

The sum of bandwidth equation: a*x+b*y+c*z+d*p=W
The relation of bandwidth per access technology shall be the same for per user per access technology, thus A:B:C:D relations shall be the same as a:b:c:d. This gives a number of relation equations:
Relation equations: A/B=a/b and A/C=a/c and A/D=a/d
Solving for b, c, and d parameters gives:
b=(B/A)*a and c=(C/A)*a and d=(D/A)*a
Exchanging b, c and d in the Sum of bandwidth equation with their respective equations gives:
Sum of bandwidth equation: a*x+(B/A)*a*y+(C/A)*a*z+(D/A)*a*p=W
Solving the parameter a from the sum of bandwidth equation gives: a=W/(x+B/A*y+C/A*z+D/A*p).
Correspondingly, the parameters b, c, and d are solved from the sum of bandwidth equation.

$$b=(B*W)/(A*x+B*y+C*z+D*p)$$

$$c=(C*W)/(A*x+B*y+C*z+D*p)$$

$$d=(D*W)/(A*x+B*y+C*z+D*p)$$

The parameters a, b, c and d can now be used by the scheduler to perform per user per access technology dynamic bandwidth fairness scheduling.

Finally the scheduler value A', B', C', D' for the respective access technology is then:

A': a*x

B': b*y

C': c*z

D': d*p

For the case in the example with 5, 2, 2, and 1 active users, the respective bandwidth ratios a, b, c, and d are, 12.90%, 9.68%, 6.45%, and 3.23%, which result in the weighted bandwidths 64.52% (first access technology) 19.35% (second), 12.90% (third), and 3.23% (fourth).

In the above described embodiment example the total bandwidth W has been measured by the transport network node, and the number of active users per access technology x, y, z, p have been received from a network node. The bandwidth ratios per access technology A, B, C, D are predefined in the transport network node. By applying these parameters, the transport network node is enabled to calculate an appropriate bandwidth ratio per access technology. Thereby, the transport network node will be able to perform a fair schedulation of packet data without further inspection or analysis of received data packets.

Figure 7:
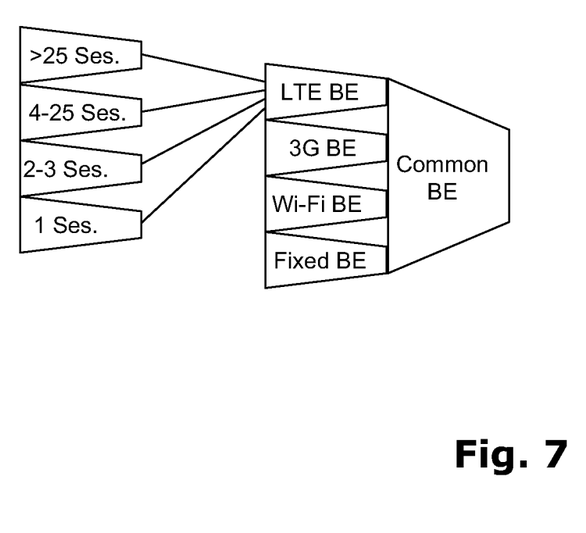
FIG. 7 is a schematic illustration of a possible embodiment.

With reference to the FIG. 7, which is a schematic illustration, a principle of an alternative method will now be described, in accordance with one alternative exemplifying embodiment. The alternative method is based on the above described embodiment, but differs in that the available bandwidth is distributed dynamically also dependent on the current number of sessions of the active users. An operator who wants to distribute available bandwidth between the active users defines a number of ranges of active sessions. In this embodiment, the operator defines four groups or ranges, namely: users who currently perform 1 session, users who currently perform 2-3 sessions, users who currently perform 4-25 sessions, and users who currently perform more than 25 sessions. By assigning a desired proportion (corresponding to A, B, C, D) of the available bandwidth within an access technology to each of the ranges, and receive the number of active users (corresponding to x, y, z, p) within each range, a bandwidth ratio (corresponding to a, b, c, d) per range, a weighted bandwidth ratio per range (corresponding to A', B', C', D') will be calculated. When scheduling, the transport network will then be able to dynamically distribute packet data also dependent on the number of sessions which the active users performs. Thereby, users who perform few sessions could be prevented from being starved by users who perform a lot of sessions.

It is also to be noted that the disclosed concept of the above described embodiments is not limited to be applied for the above described parameters, i.e. current number of users and current number of session. A designer will be free to apply any suitable parameter of combination of parameters within the disclosed concept. For instance, he/she may implement the method for active sessions only, without taking number of users within each access technology in account.

In an alternative exemplifying embodiment, which is based on one above described embodiment, the data packets are further marked with information regarding how many sessions the active user currently has established. Thereby, the transport network node is enabled to prioritise active users with fewer sessions before active users with more sessions.

By dividing the users in a reasonable amount of groups according to their number of sessions, and defining the groups appropriately, the transport network node will be enabled to distribute the available bandwidth effectively and fair between the active users. More session groups or ranges will enable better fairness between active users. However, as illustrated FIG. 7 and in the corresponding table below, also a lower amount of session groups will increase the fairness.

In the embodiment, for one specific access technology 10 users are active: 1 user who performs 1 session, 6 users who each perform between 4-25 sessions and 3 users who each perform more than 26 sessions. Within the specific access technology the 10 users will share the available transport capacity of that access technology. Consider the case when 3 users perform 30 sessions each, 6 users performs 10 sessions each and 1 user performs 1 session. In total, these 10 users perform 151 sessions. Without scheduling dividing the users in session groups, the user who performs 1 session will get $1/151=0.66\%$, while users who performs 30 sessions will get $30/151=19.9\%$ each of the available transport capacity.

By dividing the users in the session groups $g_1$, $g_2$, $g_3$ and $g_4$, calculating a Technology session weight for each of the session groups based on the number of active users in each session group, as in the table, multiplying the available transport capacity of the access technology with the appropriate Technology session weight, the session groups will be allocated the respective proportions of the available transport capacity according to the fourth column. The allocated transport capacities of the session groups are then divided within the respective session group on the active users of the session group. In this example, scheduling also based on session groups result in that each user will get assigned $1/10=10\%$ of the available bandwidth of the access technology

| Session group | # users | Per user session weight | Technology session weight |
|---|---|---|---|
| $g_4$ (>26 Sessions) | 3 | $1/10$ | $3/10$ |
| $g_3$ (4-25 Sessions) | 6 | $1/10$ | $6/10$ |
| $g_2$ (2-3 Sessions) | 0 | 0 | 0 |
| $g_1$ (1 Session) | 1 | $1/10$ | $1/10$ |

Even if the described example relates to four different access technologies, the disclosed concept is not limited to any specific numbers of access technologies, the disclosed concept may be implemented for an appropriate number of access technologies, when put into practice. In addition, the different access technologies can be allocated with bandwidth ratios to specific QoS (Quality of Service) classes, i.e. best effort, etc. Thus, when put into practice, the disclosed solution may be implemented within one specific QoS class, or between multiple QoS classes, when implementing.

Figure 8:
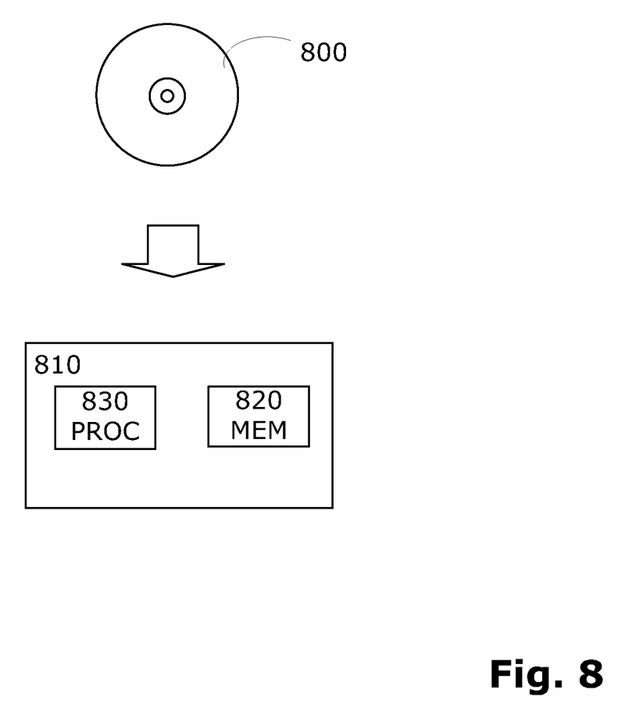
FIG. 8 is a schematic illustration of a computer program product according to possible embodiments.

According to some exemplifying embodiments, a computer program product comprises a computer readable medium such as, for example, a diskette or a CD-ROM as illustrated by 800 in FIG. 8. The computer readable medium may have stored thereon a computer program comprising program instructions. The computer program may be loadable into a data-processing unit 830, which may, for example, be comprised in a communication network node 810. When loaded into the data-processing unit 830, the computer program may be stored in a memory 820 associated with or integral to the data-processing unit 830. According to some embodiments, the computer program may, when loaded into and run by the data-processing unit 830, cause the data-processing unit 830 to execute method steps according to, for example, the method shown in the FIG. 5.

It is to be noted that the arrangements of the described exemplifying embodiments are described in a non-limiting manner. Typically, a designer may select to arrange further units and components to provide appropriate operation of the transport network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a transport network node for distributing an available bandwidth between different access technologies, the transport network node being located in a transport network and communicatively coupled with a plurality of network nodes using different access technologies to each serve one or more users, the transport network node further being communicatively coupled with a core network, the method comprising:
   obtaining an allocation scheme reflecting a desired distribution of bandwidth between the different access technologies;
   receiving, from each of the plurality of network nodes, an information comprising an access technology used by the network node and further comprising an active number of users being served by the network node using that access technology;
   receiving, from each of the plurality of network nodes, information regarding a number of sessions per active user; and
   scheduling a transport of data packets received from the plurality of network nodes by the transport network node to the core network based on the received access technologies, the received active numbers of users, the received information from each network node regarding the number of sessions per active user, and the obtained allocation scheme, wherein the scheduling comprises:
  for each access technology, determining a bandwidth ratio per active user and a range of active sessions of the active user, wherein the bandwidth ratio per active user for an access technology is determined using a total bandwidth amount measured by the transport network node, an allocated bandwidth ratio of each of the access technologies, and the active number of users of each of the access technologies; and
  determining a weighted bandwidth ratio per access technology based on the determined bandwidth ratio per active user for the access technology and also based upon the active number of users of the access technology.

2. The method according to claim 1, wherein the information comprising the access technology and the active number of users received from at least one of the plurality of network nodes is within one or more headers of one or more of the data packets.

3. The method according to claim 1, wherein each received information regarding the number of sessions per active user comprises a range of the number of sessions.

4. The method according to claim 1, wherein two of the different access technologies are from a set of:
  Long Term Evolution (LTE),
  Universal Mobile Telephony System (UMTS),
  High Speed Packet Access (HSPA),
  Wireless Fidelity (Wi-Fi),
  Digital Subscriber Line (DSL),
  Gigabit Passive Optical Network (GPON),
  Ethernet, and
  Point to point (PtP) fiber.

5. The method according to claim 2, wherein at least some of the data packets are received in accordance with:
  General Packet Radio Service Tunnelling Protocol-User Data Tunnelling (GTP-u),
  Third Generation Partnership Project (3GPP)-IuB,
  Control And Provisioning of Wireless Access Points (CAPWAP),
  Generic Routing Encapsulation (GRE), or
  Internet Protocol Security (IPSec).

6. The method according to claim 1, wherein at least one of the plurality of network nodes is integrated with the transport network node, and wherein the receiving of the information is performed internally within the transport network node.

7. A transport network node to distribute an available bandwidth between different access technologies, wherein the transport network node is to be located in a transport network and communicatively coupled with a plurality of network nodes using different access technologies to each serve one or more users, wherein the transport network node is to further be communicatively coupled with a core network, the transport network node comprising:
  one or more processors; and
  a non-transitory computer readable storage medium having instructions which, when executed by the one or more processors, cause the transport network node to perform operations comprising:
    obtaining an allocation scheme reflecting a desired distribution of bandwidth between the different access technologies;
    receiving, from each of the plurality of network nodes, an information comprising an access technology used by the network node and further comprising an active number of users being served by the network node using that access technology;
    receiving, from each of the plurality of network nodes, information regarding a number of sessions per active user; and
    scheduling a transport of data packets received from the plurality of network nodes by the transport network node to the core network based on the received access technologies, the received active numbers of users, the received information from each network node regarding the number of sessions per active user, and the obtained allocation scheme, wherein the scheduling comprises:
      for each access technology, determining a bandwidth ratio per active user and a range of active sessions of the active user, wherein the bandwidth ratio per active user for an access technology is determined using a total bandwidth amount measured by the transport network node, an allocated bandwidth ratio of each of the access technologies, and the active number of users of each of the access technologies; and
      determining a weighted bandwidth ratio per access technology based on the determined bandwidth ratio per active user for the access technology and also the active number of users of the access technology.

8. The transport network node according to claim 7, wherein the information comprising the access technology and the active number of users received from at least one of the plurality of network nodes is within one or more headers of one or more of the data packets.

9. The transport network node according to claim 7, wherein each received information regarding the number of sessions per active user comprises a range of the number of sessions.

10. The transport network node according to claim 7, wherein two of the different access technologies are from a set of:
  Long Term Evolution (LTE),
  Universal Mobile Telephony System (UMTS),
  High Speed Packet Access (HSPA),
  Wireless Fidelity (Wi-Fi),
  Digital Subscriber Line (DSL),
  Gigabit Passive Optical Network (GPON),
  Ethernet, and
  Point to point (PtP) fiber.

11. The transport network node according to claim 8, wherein at least some of the data packets are received in accordance with:
  General Packet Radio Service Tunnelling Protocol-User Data Tunnelling (GTP-u),
  Third Generation Partnership Project (3GPP)-IuB,
  Control And Provisioning of Wireless Access Points (CAPWAP),
  Generic Routing Encapsulation (GRE), or
  Internet Protocol Security (IPSec).

12. The transport network node according to claim 7, wherein the transport network node is either:
  a router,
  a Radio Network Controller (RNC),
  an access point (AP),
  an access center (AC),
  a Digital Subscriber Line Access Multiplexer (DSLAM), a Cable Modem Termination Systems (CMTS) entity, or an Optical Line Termination (OLT).

13. A non-transitory computer-readable storage medium having computer code stored therein, which when executed by a processor of a transport network node causes the transport network node to distribute an available bandwidth between different access technologies by performing operations, the transport network node being located in a transport network and communicatively coupled with a plurality of network nodes using different access technologies to each serve one or more users, the transport network node further being communicatively coupled with a core network, the operations comprising:

obtaining an allocation scheme reflecting a desired distribution of bandwidth between the different access technologies;

receiving from each of the plurality of network nodes, an information comprising an access technology used by the network node and further comprising an active number of users being served by the network node using that access technology;

receiving, from each of the plurality of network nodes, information regarding a number of sessions per active user; and scheduling a transport of data packets received from the plurality of network nodes by the transport network node to the core network based on the received access technologies, the received active numbers of users, the received information from each network node regarding the number of sessions per active user, and the obtained allocation scheme, wherein the scheduling comprises:

for each access technology, determining a bandwidth ratio per active user and a range of active sessions of the active user, wherein the bandwidth ratio per active user for an access technology is determined using a total bandwidth amount measured by the transport network node, an allocated bandwidth ratio of each of the access technologies, and the active number of users of each of the access technologies; and determining a weighted bandwidth ratio per access technology based on the determined bandwidth ratio per active user for the access technology and also based upon the active number of users of the access technology.

14. The method according to claim 2, wherein the received information within the one or more headers of the one or more of the data packets is located between one or more conventional headers and a payload.

* * * * *